Aug. 20, 1968   W. D. HOFER   3,397,524
MOWING APPARATUS HAVING BELT DRIVE
Filed Aug. 27, 1965   4 Sheets—Sheet 1
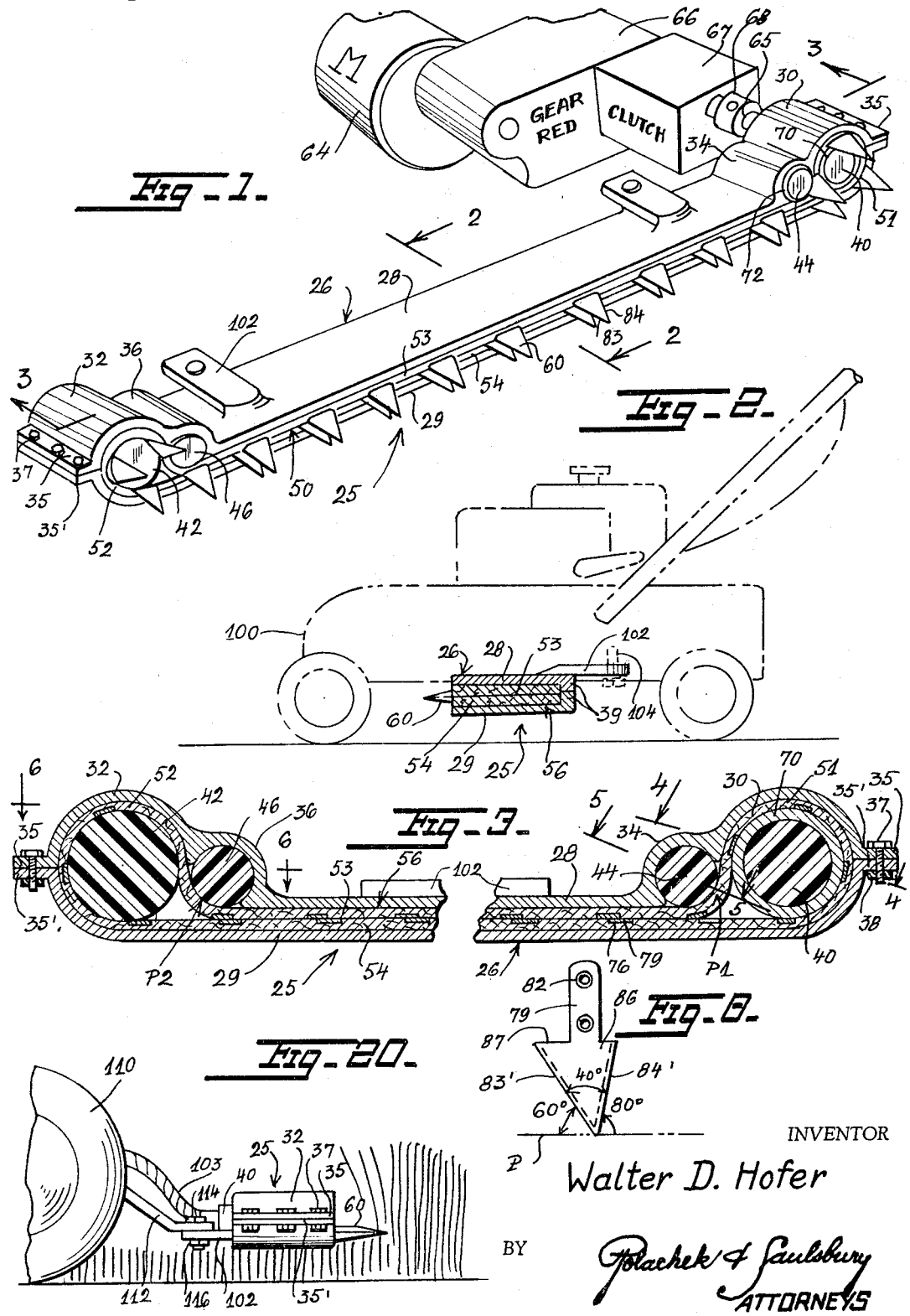
INVENTOR
Walter D. Hofer
BY Polachek & Saulsbury
ATTORNEYS

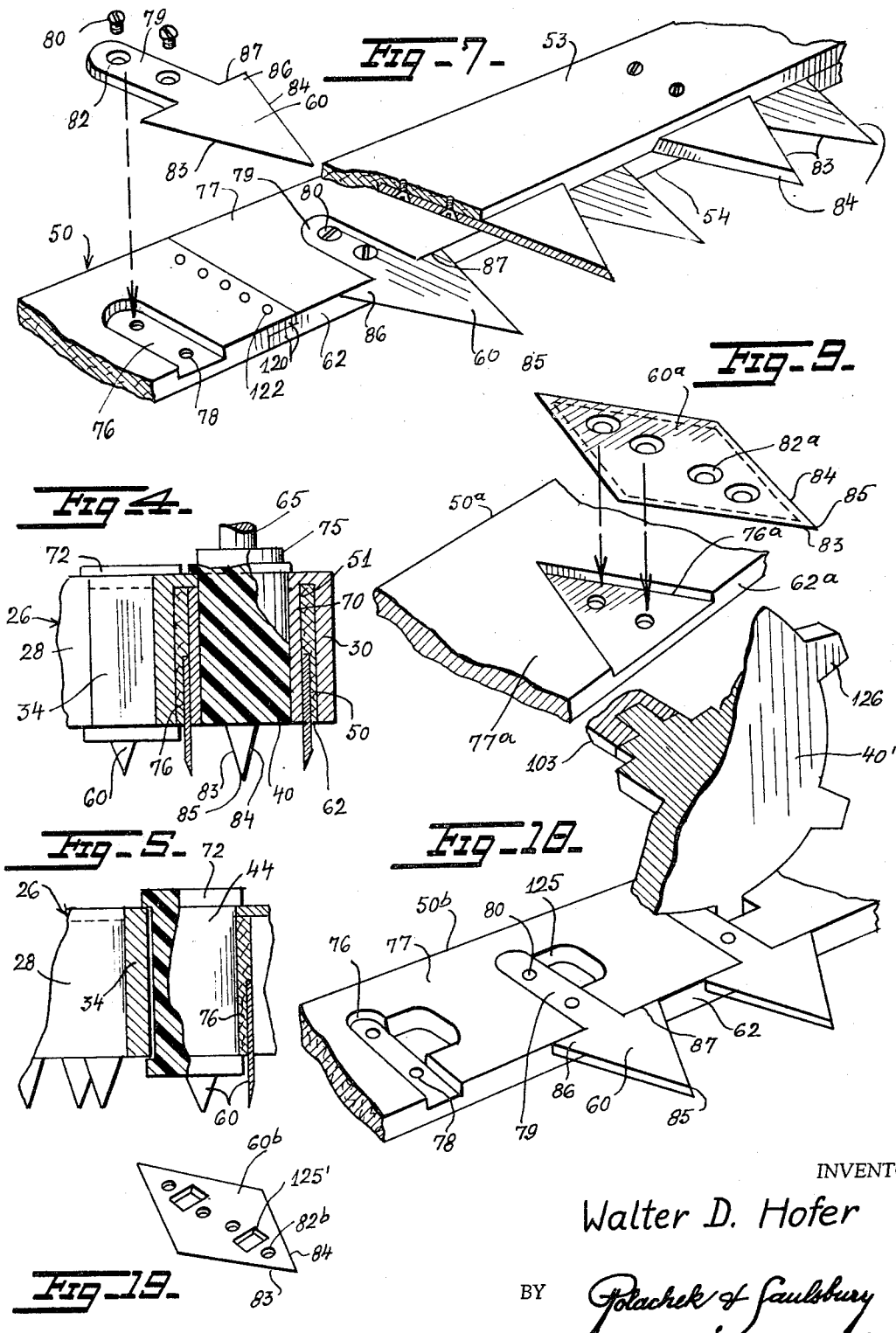

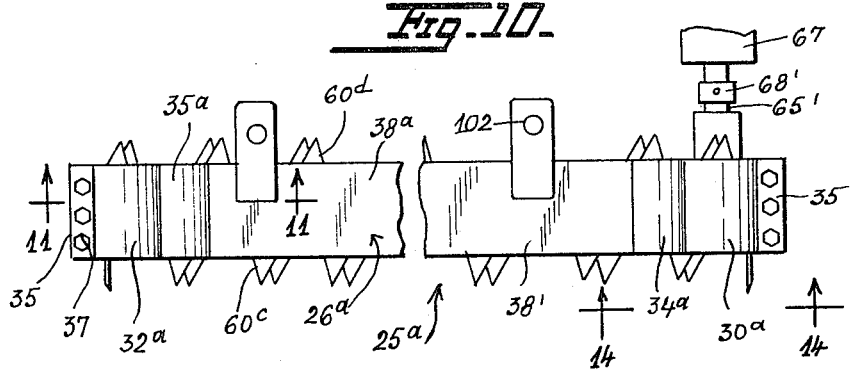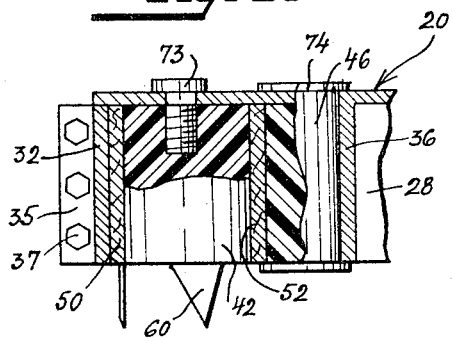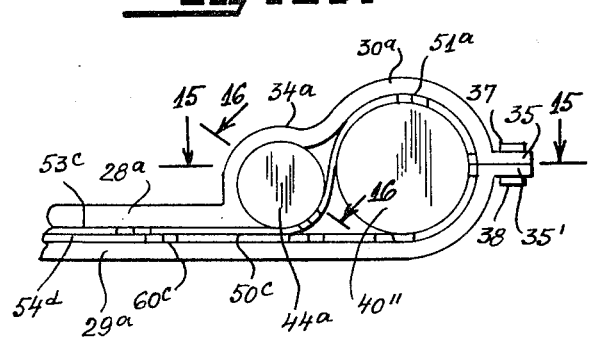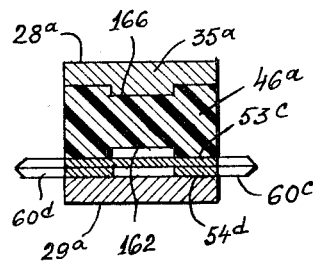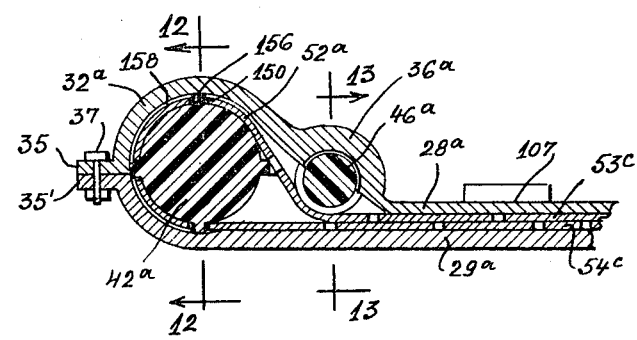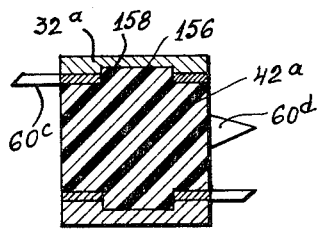

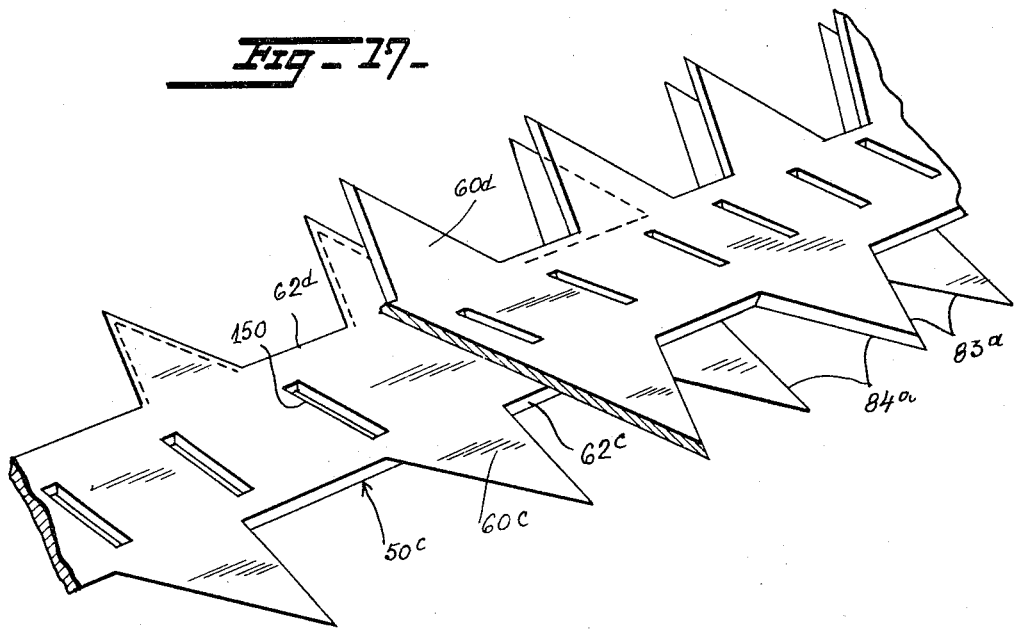
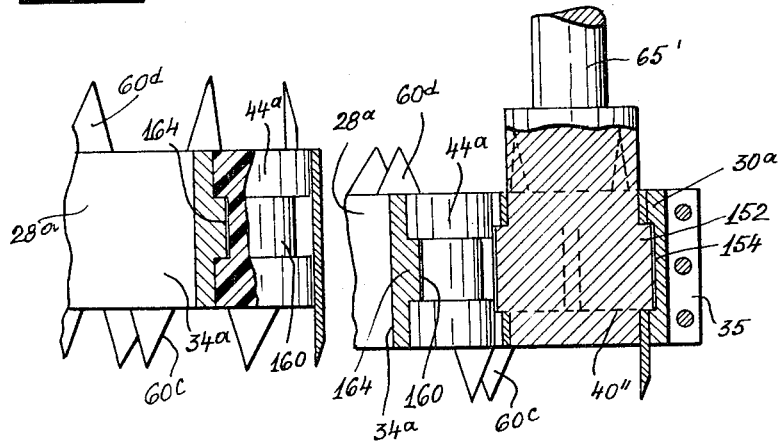

United States Patent Office 3,397,524
Patented Aug. 20, 1968

3,397,524
MOWING APPARATUS HAVING BELT DRIVE
Walter D. Hofer, Brocket, Alberta, Canada, assignor of fifty percent each to John C. Swinarton, Fort MacLeod, Alberta, and Thomas Robert Gorman, Champion, Alberta, Canada
Filed Aug. 27, 1965, Ser. No. 483,248
19 Claims. (Cl. 56—290)

This invention relates to the art of mowing machines and more particularly concerns mowing apparatus having a continuously driven belt carrying intersecting cutting blades.

This invention involves a mower assembly in which the driven belt is of simplified construction and has a simplified power drive. The belt is enclosed in a housing which serves as a guide for the belt, as a safety guard, and as a shield to prevent clogging of the blades. The belt may be provided with recesses in which the blades are removably secured. The blades may have cutting edges at opposite ends and arranged so that they can be reversed on the belt. The belt can be driven by a reversible motor. The motor can be operatively coupled to the belt via a reducing speed gear box and clutch or by a flexible shaft. Flexible guide rollers are provided to tension the belt. In another form of the invention, the blades are integral with the belt and may be disposed at opposite edges thereof. The belt may be provided with sprocket holes so that it can be driven by a drive sprocket. The mower assembly can be mounted on a tractor or may be attached to a manually operated and controlled power driven mowing machine.

It is therefore a principal object of the invention to provide a mower apparatus including an endless belt continuously driven by a drive roller, the belt carrying intersecting cutting blades.

Another object is to provide a mower apparatus as described wherein the cutting blades are removably and reversibly attached to the endless belt.

A further object is to provide a belt drive for a mower in which cutting blades are integral with the belt and may extend out of opposite edges of the belt.

Another object is to provide a mower apparatus with a driven belt carrying cutting blades, the belt being disposed in a housing which serves as a guide and shield.

Other objects are to provide a mower apparatus with a novel driven belt, with novel drive means for the driven belt, with novel belt tensioning means and with novel cutting blades.

For further comprehension of the invention and of the objects and advantages thereof, reference will be had to the following description and accompanying drawings and to the appended claims in which the various novel features of the invention are more particularly set forth.

In the accompanying drawings forming a material part of this disclosure:

FIGURE 1 is a perspective view of a mower assembly embodying the invention.

FIG. 2 is a cross sectional view taken on line 2—2 of FIG. 1.

FIG. 3 is an enlarged longitudinal sectional view taken on line 3—3 of FIG. 1, parts being broken away.

FIG. 4, FIG. 5 and FIG. 6 are sectional views taken on lines 4—4, 5—5 and 6—6 respectively of FIG. 3.

FIG. 7 is an enlarged exploded perspective view of part of the drive belt and several cutting blades as employed in the assembly of FIGS. 1–6.

FIG. 8 is a plan view of an alternative form of cutting blade.

FIG. 9 is an enlarged exploded view of part of another drive belt with a reversible form of cutting blade.

FIG. 10 is a top plan view of another mower assembly, parts being broken away.

FIG. 11 is an enlarged fragmentary sectional view taken on line 11—11 of FIG. 10.

FIG. 12 and FIG. 13 are cross sectional views taken on lines 12—12 and 13—13 respectively of FIG. 11.

FIG. 14 is a fragmentary enlarged front elevational view taken on line 14—14 of FIG. 10.

FIG. 15 and FIG. 16 are fragmentary sectional views taken on lines 15—15 and 16—16 of FIG. 14.

FIG. 17 is an enlarged perspective view of part of the drive belt employed in the mower assembly of FIGS. 10–16.

FIG. 18 is an enlarged perspective view of part of another drive belt with cutting blades with a sprocket driver.

FIG. 19 is a perspective view of another form of cutting blade.

FIG. 20 is an end view of a mower assembly mounted on a tractor.

Referring first to FIGS. 1–6, there is shown a mower assembly 25 including an elongated housing 26 having two flat parallel walls 28, 29 slightly spaced apart. Opposite ends of the walls 28, 29 are curved outwardly and shaped to define larger generally cylindrical axially horizontal end chambers 30, 32 and two smaller chambers 34, 36 located adjacent to chamber 30, 32 respectively. The two walls of the housing may be formed with end flanges 35 and 35' abutted to each other and secured by bolts 37 and nuts 38. The housing may have vertical flanges 39 formed at rear edges of the walls 28, 29 and abutted to each other so that the housing is closed at its rear edge and is opened only at its front edge facing forwardly as shown in FIGS. 1 and 2. Two cylindrical rollers 40, 42 are rotatably disposed in chambers 30, 32 respectively at opposite ends of the housing. Two smaller cylindrical idler rollers 44, 46 are disposed rotatably in chambers 34, 36, respectively.

An endless flat belt 50 has looped ends 51, 52 entrained or engaged on rollers 40, 42. The belt has two straight upper and lower courses or sections 53, 54 slidably juxtaposed to each other and movably disposed in the long, narrow compartment 56 defined between walls 28, 29. The spacing of the walls is substantially equal to twice the thickness of the belt. The belt carries cutting blades 60 extending outwardly of the forward edge 62 of the belt. These flat blades are spaced apart longitudinally of the belt and cooperate with each other at flat, straight belt sections 53, 54 to exert a cutting action on grain, grass or the like which may enter between the blades.

The belt may be driven continuously in the direction of its length by a motor 64 of any suitable type and connected to axial shaft 65 of roller 40 via speed reduction gearing in gear box 66, a clutch 67 and coupling 68. On roller 40 may be fitted a friction sleeve 70 which frictionally engages the inner side of the belt for driving the same.

In order to tension the belt and to guide the belt on rollers 40, 42 the above noted idler rollers 44, 46 are provided. It will be noted that the belt sections 53, 54 extend under these rollers and separate there to form loops 51, 52 on rollers 40, 42. The rollers 44, 46 are preferably made of resilient plastic or rubber which exert spring pressure on the belt at points P1 and P2 indicated in FIG. 3 to keep the belt tensioned around rollers 40 and 42 respectively. Rollers 44, 46 have end flanges 72, 74 which hold the rollers in the housing 26 and prevent them from moving axially out of chambers 34, 36; see FIGS. 5 and 6. Roller 42 is held rotatably by bolt 73 in chamber 32. Roller 40 is held rotatably in chamber 30 by sleeve 70 and an annular flange 75 on the core of the roller; see FIG. 4. The separable walls 28, 29 permit the belt and rollers to be mounted easily in housing 26.

The belt is formed at its inner side 77 with recesses 76 extending transversely of the belt inwardly from the forward edge 62; see FIGS. 2–5 and 7. Threaded holes 78 are formed in the belt at these recesses. Blades 60 are formed like arrowheads each having a straight shank 79 which fits into a recess 76 flush with surface of inner side 77. Screws 80 inserted in holes 82 in the shanks to hold the blades to the belt are noted. Alternatively rivets may be employed to secure the blades to the belt. Each blade has two angularly disposed cutting edges 83, 84 which terminate in a point 85 outwardly of the belt. Each blade has a generally triangular body extending outwardly of the belt with two wings 85 having aligned rear edges 87. These edges of the wings abut the front edge 62 of the belt and in cooperation with shank 79 seated in recess 76 insure that the blades are rigid in the planes of the belt sections 53, 54. In exerting a cutting action one edge 83 of one blade on one section of the belt will cooperate with an edge 83 of another blade on another adjacent section of the belt in one direction of belt travel. In the opposite direction of belt travel edges 84 of blades on adjacent sections of the belt will intersect to exert cutting action.

FIG. 8 shows a blade construction which has been found to provide certain advantages. The edges 83', 84' are disposed at an angle of about 40° to each other, with edge 83' being about 60° to the path P of travel of point 85 while edge 84 is about 80° to path P. Edges 83' will cut grass and fine stemmed grain best while edges 84' will cut stalks of plants like flax best when the motor is reversed. This efficient cutting action is obtained in both directions of drive of the belt.

The assembly 25 can be mounted at the underside of a hand manipulated power motor machine 100 indicated by dotted lines in FIG. 2. Apertured spaced bracket bars 102 may be provided at the upper side of housing wall 28 to receive bolts 104 for attaching the mowing assembly to the frame of machine 100. Alternatively a flexible shaft 103 can be connected to roller 40 to drive the same as shown in FIG. 20. This flexible shaft may be a power takeoff means from a tractor 110. The mowing assembly may be mounted on the frame 112 of the tractor by bolts 114 and nuts 116.

In FIG. 9, the recesses 76a of belt 50a are triangular in shape. Each flat cutting blade 60a may be parallelogrammic or diamond shaped. One triangular half of the blade 60a can be seated in each triangular recess 76a or inner side 77a while the other half of the blade extends outwardly of belt edge 62a. The diamond-shaped blade is reversible end-for-end. Screws or rivets can be used to attach blades 60a to the belt, inserted in holes 82a. Belts 50 and 50a may be made of single lengths or strips of leather, plastic or synthetic rubber. Ends 120 of the strips will be rabetted and abutted as shown in FIG. 7, and secured by screws or rivets 122. If a belt should break, another belt section can be spliced into the belt to effect a repair.

The mowing assembly may have a drive roller which exerts a sprocket drive rather than a friction drive. This is illustrated in FIG. 18, where belt 50b has holes 125 formed therein and spaced apart longitudinally of the belt to receive sprocket teeth or cogs 126 formed on drive roller 40'. The holes 125 may be located adjacent to recesses 76 in which the shanks 79 of blades 60 are secured. This construction is desirable since the shanks of the blades will serve as stiffeners and bearing elements against which the driving cogs of the sprockets will bear. This will prolong the useful life of the belt.

If desired diamond-shaped blades 60b may be provided with holes 125' as shown in FIG. 19. These holes will receive the cogs 126 of drive sprocket or roller 40'. The edges of holes 125' will serve as bearing surfaces to receive driving pressure of the drive sprocket and will relieve the belt of direct driving contact with the drive sprocket. Holes 82b in blades 60b receive mounting screws or rivets.

FIGS. 10–17 illustrate another mowing assembly 25a which is generally similar to mowing assembly 25 and corresponding parts are identically numbered. In mowing assembly 25a, endless belt 50c has a row of flat blades 60c integrally formed therewith. The belt is made of spring steel like that of a band saw. The flat blades are spaced apart longitudinally of the belt and extend out of front edge 62c of the belt. A second row of blades 60d may also be integrally formed with the belt and will extend out of rear edge 62d.

The belt has a series of slots or holes 150 spaced apart longitudinally of the belt. These holes receive cogs 152 on drive roller or drive sprocket 40". The roller has a shaft 65' coupled to clutch 67 via coupling 68'. The drive roller 40" is prevented from moving axially out of the chamber 30a in housing 26a by slidable engagement of the cogs 152 in a circumferentially extending groove 154 formed at the inner side of the chamber 30a in both upper and lower housing walls 28a, 29a. Idler roller 42a at the other end of the housing is provided with cogs 156 which engage in the holes 150 of the belt. These cogs ride in circumferentially extending groove 158 formed in upper and lower parts of end chamber 32a. Idler rollers 44a and 46a in chambers 34a, 36a adjacent to rollers 40" and 42a guide the belt sections 53c, 54c to form end loops 51a and 52a around rollers 40" and 42a. Rollers 44a and 46a have circumferential grooves 160, 162 which engage circumferential ridges 164, 166 formed on the inner sides of chambers 34a, 36a to hold the rollers in the housing 26a. The rear flanges 39 provided for housing 26 are omitted in housing 26a so that the blades 60d extend out of the rear of the housing. Thus the mowing assembly is effected to cut grass, grain, and the like while the assembly is being moved forwardly and rearwardly. Each of the blades has two angularly disposed sharp edges 83a, 84a so that the blades cut efficiently while the belt is driven in one direction or the other. The edges can be at a 40° angle to each other as illustrated in FIG. 8. The belt sections 53c, 54c move in narrow compartment 56a defined between the upper and lower walls 28a, 29a of the housing 26a. The bolts 37 and nuts 38 can be easily disengaged for disassembling the housing to insert the rollers and belt or to remove them.

The mowing assembly 25a can be mounted on a hand operated power motor or can be driven by a flexible shaft in the same manner as illustrated for assembly 25 in FIGS. 2 and 20.

If an endless belt with integral blades on only one edge is provided, this blade can be used in housing 26 of mowing assembly 25 shown in FIG. 1. Belt 60' with two rows of blades on opposite edges can be used in housing 26 of assembly 25. This belt will then be reversible on rollers 40, 42 so that either row of blades can extend outwardly of the open front of the mower housing 26. If desired the rear blades can be omitted from belt 60' employed in mowing assembly 25a.

In all forms of the invention described, there is provided an endless belt carrying and driving cutting blades to exert a cutting action between intersecting cutting edges of blades on opposite sides of juxtaposed straight courses or sections of the belt. The belts can be driven in reverse directions. The moving assemblies described are less complicated and less expensive to manufacture than prior mowing assemblies employing chain drives. The present mowing assemblies require less servicing and are simpler to use and keep in adjustment. They are quickly assembled and disassembled.

While I have illustrated and described the preferred embodiments of my invention, it is to be understood that I do not limit myself to the precise constructions herein disclosed and that various changes and modifications may be made within the scope of the invention as defined in the appended claims.

What is claimed is:

1. A mower assembly comprising an endless flexible belt, spaced cutting blades with angularly disposed cutting edges extending outwardly of one edge of said belt, said blades being flush with the inner side of the belt, a housing including a pair of flat walls disposed parallel to each other, means holding said walls spaced apart at adjacent portions thereof a distance equal to twice the thickness of said belt, said belt having juxtaposed straight sections located between looped ends thereof slidably disposed between said plates, two rollers at opposite ends respectively of said housing enclosed by said walls, said looped ends of the belt being engaged on said rollers, and motor means connected to one of the rollers for driving the belt continuously so that the cutting blades at said straight sections of the belt slidably cooperate with each other to exercise a cutting action while the belt is driven.

2. A mower assembly comprising an endless flexible belt, spaced cutting blades with angularly disposed cutting edges extending outwardly of one edge of said belt, said blades being flush with the inner side of the belt, a housing including a pair of flat walls disposed parallel to each other, means holding said walls spaced apart at adjacent portions thereof a distance equal to twice the thickness of said belt, said belt having juxtaposed straight sections located between looped ends thereof slidably disposed between said plates, two rollers at opposite ends respectively of said housing enclosed by said walls, said looped ends of the belt being engaged on said rollers, and motor means connected to one of the rollers for driving the belt continuously so that the cutting blades at said straight sections of the belt slidably cooperate with each other to exercise a cutting action while the belt is driven, said belt having a multiplicity of recesses therein extending outwardly from said inner side of the belt, said blades having portions seated in said recesses respectively, and detachable fastener means holding said portions of the baldes in the recesses so that the blades are removable from and replaceable on the belt.

3. A mower assembly comprising an endless flexible belt, spaced cutting blades with angularly disposed cutting edges extending outwardly of one edge of said belt, said blades being flush with the inner side of the belt, a housing including a pair of flat walls disposed parallel to each other, means holding said walls spaced apart at adjacent portions thereof a distance equal to twice the thickness of said belt, said belt having juxtaposed straight sections located between looped ends thereof slidably disposed between said plates, two rollers at opposite ends respectively of said housing enclosed by said walls, said looped ends of the belt being engaged on said rollers, and motor means connected to one of the rollers for driving the belt continuously so that the cutting blades at said straight sections of the belt slidably cooperate with each other to exercise a cutting action while the belt is driven, said belt having a multiplicity of recesses therein extending outwardly from said inner side of the belt, said blades having portions seated in said recesses respectively and detachable fastener means holding said portions of the blades in the recesses so that the blades are removable from and replaceable on the belt, said portions of the blades being straight shanks, said blades having angularly disposed cutting edges terminating at straight aligned wings abutting said one edge of the belt.

4. A mower assembly comprising an endless flexible belt, spaced cutting blades with angularly disposed cutting edges extending outwardly of one edge of said belt, said blades being flush with the inner side of the belt, a housing including a pair of flat walls disposed parallel to each other, means holding said walls spaced apart at adjacent portions thereof a distance equal to twice the thickness of said belt, said belt having juxtaposed straight sections located between looped ends thereof slidably disposed between said plates, two rollers at opposite ends respectively of said housing enclosed by said walls, said looped ends of the belt being engaged on said rollers, and motor means connected to one of the rollers for driving the belt continuously so that the cutting blades at said straight sections of the belt slidably cooperate with each other to exercise a cutting action while the belt is driven, said belt having a multiplicity of recesses therein extending outwardly from said inner side of the belt, said blades having portions seated in said recesses respectively and detachable fastener means holding said portions of the blades in the recesses so that the blades are removable from and replaceable on the belt, said portions of the blades being straight shanks, said blades having angularly disposed cutting edges terminating at straight aligned wings, abutting said one edge of the belt, the cutting edges of each blade being disposed at approximately a forty degree angle to each other.

5. A mower assembly comprising an endless flexible belt, spaced cutting blades with angularly disposed cutting edges extending outwardly of one edge of said belt, said blades being flush with the inner side of the belt, a housing including a pair of flat walls disposed parallel to each other, means holding said walls spaced apart at adjacent portions thereof a distance equal to twice the thickness of said belt, said belt having juxtaposed straight sections located between looped ends thereof slidably disposed between said plates, two rollers at opposite ends respectively of said housing enclosed by said walls, said looped ends of the belt being engaged on said rollers, and motor means connected to one of the rollers for driving the belt continuously so that the cutting blades at said straight sections of the belt slidably cooperate with each other to exercise a cutting action while the belt is driven, said belt having a multiplicity of recesses therein extending outwardly from said inner side of the belt, said blades having portions seated in said recesses respectively, and detachable fastener means holding said portions of the blades in the recesses so that the blades are removable from and replaceable on the belt, each of said blades having cutting edges disposed at approximately a forty degree angle to each other.

6. A mower assembly comprising an endless flexible belt, spaced cutting blades with angularly disposed cutting edges extending outwardly of one edge of said belt, said blades being flush with the inner side of the belt, a housing including a pair of flat walls disposed parallel to each other, means holding said walls spaced apart at adjacent portions thereof a distance equal to twice the thickness of said belt, said belt having juxtaposed straight sections located between looped ends thereof slidably disposed between said plates, two rollers at opposite ends respectively of said housing enclosed by said walls, said looped ends of the belt being engaged on said rollers, and motor means connected to one of the rollers for driving the belt continuously so that the cutting blades at said straight sections of the belt slidably cooperate with each other to exercise a cutting action while the belt is driven, said belt having a multiplicity of recesses therein extending outwardly from said inner side of the belt, said blades having portions seated in said recesses respectively, and detachable fastener means holding said portions of the blades in the recesses so that the blades are removable from and replaceable on the belt, said recesses being triangular in shape and said blades being diamond-shaped so that the blades are reversible end-for-end in the recesses.

7. A mower assembly comprising an endless flexible belt, spaced cutting blades with angularly disposed cutting edges extending outwardly of one edge of said belt, said blades being flush with the inner side of the belt, a housing including a pair of flat walls disposed paralled to each other, means holding said walls spaced apart at adjacent portions thereof a distance equal to twice the thickness of said belt, said belt having juxtaposed straight sections located between looped ends thereof slidably disposed between said plates, two rollers at opposite ends respectively of said housing enclosed by said walls, said looped ends of the belt being engaged on said rollers, and motor means connected to one of the rollers for driving the belt continuously so that the cutting blades at said straight sections of the belt slidably cooperate with each other to exercise a cutting action while the belt is driven, said belt having a multiplicity of recesses therein extending outwardly from said inner side of the belt, said blades having portions seated in said recesses respectively, and detachable fastener means holding said portions of the blades in the recesses so that the blades are removable from and replaceable on the belt, said belt having holes spaced apart longitudinally of the belt, said one roller having sprocket cogs engaging in said holes to drive the belt.

8. A mower assembly comprising an endless flexible belt, spaced cutting blades with angularly disposed cutting edges extending outwardly of one edge of said belt, said blades being flush with the inner side of the belt, a housing including a pair of flat walls disposed parallel to each other, means holding said walls spaced apart at adjcent portions thereof a distance equal to twice the thickness of said belt, said belt having juxtaposed straight sections located between looped ends thereof slidably disposed between said plates, two rollers at opposite ends respectively of said housing enclosed by said walls, said looped ends of the belt being engaged on said rollers, and motor means connetced to one of the rollers for driving the belt continuously so that the cutting blades at said straight sections of the belt slidably cooperae with each other to exercise a cutting action while the belt is driven, said belt having a multiplicity of recesses therein extending outwardly from said inner side of the belt, said blades having portions seated in said recesses respectively and detachable fastener means holding said portions of the blades in the recesses so that the blades are removable from and replaceable on the belt, said portions of the blades being straight shanks, said blades having angularly disposed cutting edges terminating at straight aligned wings abutting said one edge of the belt, said belt having holes spaced apart longitudinally of the belt, said one roller having sprocket cogs engaging in said holes to drive the belt.

9. A mower assembly comprising an endless flexible belt, spaced cutting blades with angularly disposed cutting edges extending outwardly of one edge of said belt, said blades being flush with the inner side of the belt, a housing including a pair of flat walls disposed parallel to each other, means holding said walls spaced apart at adjcent portions thereof a distance equal to twice the thickness of said belt, said belt having juxtaposed straight sections located between looped ends thereof slidably disposed between said plates, two rollers at opposite ends respectively of said housing enclosed by said walls, said looped ends of the belt being engaged on said rollers, and motor means connected to one of the rollers for driving the belt continuously so that the cutting blades at said straight sections of the belt slidably cooperate with each other to exercise a cutting action while the belt is driven, and a pair of resilient idler rollers, said idler rollers being disposed adjacent to the first named rollers respectively with portions of the belt therebetween to tension the belt on the first named rollers.

10. A mower assembly comprising an endless flexible belt, spaced cutting blades with angularly disposed cutting edges extending outwardly of one edge of said belt, said blades being flush with the inner side of the belt, a housing including a pair of flat walls disposed parallel to each other, means holding said walls spaced apart at adjacent portions thereof a distance equal to twice the thickness of said belt, said belt having juxtaposed straight sections located between looped ends thereof slidably disposed between said plates, two rollers at opposite ends respectively of said housing enclosed by said walls, said looped ends of the belt being engaged on said rollers, and motor means connected to one of the rollers for driving the belt continuously so that the cutting blades at said straight sections of the belt slidably cooperate with each other to exercise a cutting action while the belt is driven, and a pair of resilient idler rollers, said idler rollers being disposed adjacent to the first named rollers respectively with portions of the belt therebetween to tension the belt on the first named rollers, said belt having a multiplicity of recesses therein extending outwardly from said inner side of the belt, said blades having portions seated in said recesses respectively, and detachable fastener means holding said portions of the blades in the recesses so that the blades are removable from and replaceable on the belt.

11. A mower assembly comprising an endless flexible belt, spaced cutting blades with angularly disposed cutting edges extending outwardly of one edge of said belt, said blades being flush with the inner side of the belt, a housing including a pair of flat walls disposed parallel to each other, means holding said walls spaced apart at adjcent portions thereof a distance equal to twice the thickness of said belt, said belt having juxtaposed straight sections located between looped ends thereof slidably disposed between said plates, two rollers at opposite ends respectively of said housing enclosed by said walls, said looped ends of the belt being engaged on said rollers, and motor means connected to one of the rollers for driving the belt continuously so that the cutting blades at said straight sections of the belt slidably cooperate with each other to exercise a cutting action while the belt is driven, and a pair of resilient idler rollers, said idler rollers being disposed adjacent to the first named rollers respectively with portions of the belt therebetween to tension the belt on the first named rollers, said belt having a multiplicity of recesses therein extending outwardly from said inner side of the belt, said blades having portions seated in said recesses respectively and detachable fastener means holding said portions of the blades in the recesses so that the blades are removable from and replaceable on the belt, said belt having holes spaced apart longitudinally of the belt, said one roller having sprocket cogs engaging in said holes to drive the belt.

12. A mower assembly comprising an endless flexible belt, spaced cutting blades with angularly disposed cutting edges extending outwardly of one edge of said belt, said blades being flush with the innerside of the belt, a housing including a pair of flat walls disposed parallel to each other, means holding said walls spaced apart at adjacent portions thereof a distance equal to twice the thickness of said belt, said belt having juxtaposed straight sections located between looped ends thereof slidably disposed between said plates, two rollers at opposite ends respectively of said housing enclosed by said walls, said looped ends of the belt being engaged on said rollers, and motor means connected to one of the rollers for driving the belt continuously so that the cutting blades at said straight sections of the belt slidably cooperate with each other to exercise a cutting action while the belt is driven, said belt having a multiplicity of recesses therein extending outwardly from said inner side of the belt, said blades having portions seated in said recesses respectively, and detachable fastener means holding said portions of the blades in the recesses so that the blades are removable from and replaceable on the belt, said recesses being triangular in shape and said blades being diamond-shaped so that the blades are reversible end-for-end in the recesses, said one roller having sprocket cogs thereon, said blades having holes therein receiving said cogs so that the belt is driven by engagement of the cogs with the blades.

13. A mower assembly comprising an endless flexible belt, spaced cutting blades with angularly disposed cutting edges extending outwarldy of one edge of said belt, said blades being flush with the inner side of the belt, a housing including a pair of flat walls disposed parallel to each other, quick detachable means holding the walls spaced apart at adjacent portions thereof a distance equal to twice the thickness of said belt, said belt having juxtaposed straight sections located between looped ends thereof slidably disposed between said plates, two rollers at opposite ends respectively of said housing enclosed by said walls, said looped ends of the belt being engaged on said rollers, and motor means connected to one of the rollers for driving the belt continuously so that the cutting blades at said straight sections of the belt slidably cooperate with each other to exercise a cutting action while the belt is driven.

14. A mower assembly comprising an endless flexible belt, spaced cutting blades with angularly disposed cutting edges extending outwardly of one edge of said belt, said blades being flush with the innerside of the belt, a housing including a pair of flat walls disposed parallel to each other, means holding said walls spaced apart at adjacent portions thereof a distance equal to twice the thickness of said belt, said belt having juxtaposed straight sections located between looped ends thereof slidably disposed between said plates, two rollers at opposite ends respectively of said housing enclosed by said walls, said looped ends of the belt being engaged on said rollers, and motor means connected to one of the rollers for driving the belt continuously so that the cutting blades at said straight sections of the belt slidably cooperate with each other to exercise a cutting action while the belt is driven, said belt having a multiplicity of recesses therein extending outwardly from said inner side of the belt, said blades having portions seated in said recesses respectively, and detachable fastener means holding said portions of the blades in the recesses so that the blades are removable from and replaceable on the belt, said recesses being triangular in shape and said blades being diamond-shaped so that the blades are reversible end-for-end in the recesses, said one roller having sprocket cogs thereon, said blades having holes therein receiving said cogs so that the belt is driven by engagement of the cogs with the blades, said blades being integrally formed with the belt.

15. A mower assembly comprising an endless flexible belt, spaced cutting blades with angularly disposed cutting edges extending outwardly of one edge of said belt, said blades being flush with the inner side of the belt, a housing including a pair of flat walls disposed parallel to each other, quick detachable means holding the walls spaced apart at adjacent portions thereof a distance equal to twice the thickness of said belt, said belt having juxtaposed straight sections located between looped ends thereof slidably disposed between said plates, two rollers at opposite ends respectively of said housing enclosed by said walls, said looped ends of the belt being engaged on said rollers, and motor means connected to one of the rollers for driving the belt continuously so that the cutting blades at said straight sections of the belt slidably cooperate with each other to exercise a cutting action while the belt is driven, said belt having other blades integrally formed therewith spaced apart longitudinally of the belt and extending outwardly of the other edge of the belt and outwardly of said housing.

16. A mower assembly comprising an endless flexible belt, spaced cutting blades with angularly disposed cutting edges extending outwardly of one edge of said belt, said blades being flush with the inner side of the belt, a housing including a pair of flat walls disposed parallel to each other, quick detachable means holding the walls spaced apart at adjacent portions thereof a distance equal to twice the thickness of said belt, said belt having juxtaposed straight sections located between looped ends thereof slidably disposed between said plates, two rollers at opposite ends respectively of said housing enclosed by said walls, said looped ends of the belt being engaged on said rollers, and motor means connected to one of the rollers for driving the belt continuously so that the cutting blades at said straight sections of the belt slidably cooperate with each other to exercise a cutting action while the belt is driven, said belt having a series of holes formed therein and spaced apart longitudinally of the belt, said one roller having sprocket cogs engaging in said holes in the belt to drive the same.

17. A mower assembly comprising an endless flexible belt, spaced cutting blades with angularly disposed cutting edges extending outwardly of one edge of said belt, said blades being flush with the inner side of the belt, a housing including a pair of flat walls disposed parallel to each other, quick detachable means holding the walls spaced apart at adjacent portions thereof a distance equal to twice the thickness of said belt, said belt having juxtaposed straight sections located between looped ends thereof slidably disposed between said plates, two rollers at opposite ends respectively of said housing enclosed by said walls, said looped ends of the belt being engaged on said rollers, and motor means connected to one of the rollers for driving the belt continuously so that the cutting blades at said straight sections of the belt slidably cooperate with each other to exercise a cutting action while the belt is driven, said belt having other blades integrally formed therewith spaced apart longitudinally of the belt and extending outwardly of the other edge of the belt and outwardly of said housing, and a pair of idler rollers disposed adjacent to the first named rollers respectively and rotatably disposed between said walls of the housing to tension the belt on the two end rollers.

18. A mower assembly comprising an endless flexible belt, spaced cutting blades with angularly disposed cutting edges extending outwardly of one edge of said belt, said blades being flush with the inner side of the belt, a housing including a pair of flat walls disposed parallel to each other, quick detachable means holding the walls spaced apart at adjacent portions thereof a distance equal to twice the thickness of said belt, said belt having juxtaposed straight sections located between looped ends thereof slidably disposed between said plates, two rollers at opposite ends respectively of said housing enclosed by said walls, said looped ends of the belt being engaged on said rollers, and motor means connected to one of the rollers for driving the belt continuously so that the cutting blades at said straight sections of the belt slidably cooperate with each other to exercise a cutting action while the belt is driven, said belt having other blades integrally formed therewith spaced apart longitudinally of the belt and extending outwardly of the other edge of the belt and outwardly of said housing, and a pair of idler rollers disposed adjacent to the first named rollers respectively and rotatably disposed between said walls of the housing to tension the belt on the two end rollers.

19. A mower assembly comprising an endless flexible belt, spaced cutting blades with angularly disposed cutting edges extending outwardly of one edge of said belt, said blades being flush with the inner side of the belt, a housing including a pair of flat walls disposed parallel to each other, quick detachable means holding the walls spaced apart at adjacent portions thereof a distance equal to twice the thickness of said belt, said belt having juxtaposed straight sections located between looped ends thereof slidably disposed between said plates, two rollers at opposite ends respectively of said housing enclosed by said walls, said looped ends of the belt being engaged on said rollers, and motor means connected to one of the rollers for driving the belt continuously so that the cutting blades at said straight sections of the belt slidably cooperate with each other to exercise a cutting action while the belt is driven, said belt having other blades integrally formed therewith spaced apart longitudinally of the belt and extending outwardly of the other edge of the belt and outwardly of said housing, and a pair of idler rollers disposed adjacent to the first named rollers respectively and rotatably disposed between said walls of the housing to tension the belt on the two end rollers, said belt having a series of holes formed therein and spaced apart longitudinally of the belt, said one roller having sprocket cogs engaging in said holes in the belt to drive the same.

References Cited

UNITED STATES PATENTS

| | | | |
|---|---|---|---|
| 380,304 | 3/1888 | Wells | 56—291 |
| 605,074 | 6/1898 | Burhans | 56—244 |
| 845,547 | 2/1907 | Hathaway | 56—290 |
| 2,291,182 | 7/1942 | Blalack | 56—291 |

FOREIGN PATENTS 760,827  11/1956  Great Britain.

RUSSELL R. KINSEY, *Primary Examiner.*